FIG. I

INVENTORS
DANIEL H. ZWIGHT &
ROBERT B. MITCHELL
BY

ATTORNEY

April 16, 1968 D. H. ZWIGHT ETAL 3,378,103
AERIAL PLATFORMS

Filed Sept. 29, 1965 11 Sheets-Sheet 5

INVENTORS
DANIEL H. ZWIGHT &
ROBERT B. MITCHELL
BY
ATTORNEY

April 16, 1968     D. H. ZWIGHT ETAL     3,378,103
AERIAL PLATFORMS
Filed Sept. 29, 1965     11 Sheets-Sheet 6

INVENTORS
DANIEL H. ZWIGHT &
ROBERT B. MITCHELL
BY

ATTORNEY

April 16, 1968   D. H. ZWIGHT ET AL   3,378,103
AERIAL PLATFORMS

Filed Sept. 29, 1965   11 Sheets-Sheet 7

INVENTORS
DANIEL H. ZWIGHT &
ROBERT B. MITCHELL
BY
ATTORNEY

FIG. 28

United States Patent Office 3,378,103
Patented Apr. 16, 1968

3,378,103
AERIAL PLATFORMS
Daniel H. Zwight and Robert B. Mitchell, St. Louis County, Mo., assignors to McCabe-Powers Body Company, St. Louis, Mo., a corporation of Missouri
Filed Sept. 29, 1965, Ser. No. 491,295
24 Claims. (Cl. 182—141)

ABSTRACT OF THE DISCLOSURE

An aerial platform unit having inner and outer laterally spaced beams which are hingedly connected to one another by means of a hinge pin extending through laterally offset overlapping hinge members located on the ends of the beams. Scissors-type links are connected to the inner and outer beams in the space intermediate the beams and one of the links is also connected to the piston of a hydraulic cylinder, the barrel of which is connected to the inner beam. A basket-like work platform having remote controls is located on the outer end of the outer beam. The inner end of the inner beam is pinned to a mast which in turn is mounted on a truck provided with outriggers. The mast includes a fixed rotator gear having an upwardly opening recess and an annular horizontal groove opening into the recess. A turret is rotatably mounted on the gear and includes a pair of arcuate guide elements which project into and slidably engage the walls of the groove. The turret carries a hydraulic motor which acts through a train of spur gears, interconnecting it and the teeth of the fixed rotator gear, for rotating the turret and beams.

This invention relates in general to certain new and useful improvements in aerial platform units and, more particularly, an aerial platform unit of the articulated beam variety.

Many industrial organizations, such as public utilities, which find it necessary to service overhead equipment such as power lines, overhead street fixtures, pole mounted transformers, and the like, have found so-called aerial platform units ideally suited to their needs, and, as a result, such units have experienced increased popularity during the last decade. Aerial platform units generally employ a rotatable mast assembly mounted securely on the frame of a truck or other movable support. The mast assembly, in turn, swingably supports a plurality of beams, the outermost of which is provided at its end with a basket or aerial work platform adapted to support a workman. The basket is provided with a set of controls which the workman therein can manipulate and thereby adjust the exact position of the basket in spaced relation to the truck. Generally, two different methods are used to operatively connect the beams so that the distance of the basket from the mast assembly can be varied. One method employs what are commonly called articulated beams, while the other uses telescopic beams. The latter type of platform units, namely, those having baskets mounted on telescopic beams, generally find use in work performed at moderate heights involving relatively imprecise positioning and light loads, while the latter type is used for work at considerable heights with relatively heavy loads. For example, double baskets in which two men can work at extended heights are almost always carried aloft on articulated beams.

Articulated beam aerial platform units generally employ two beams which are hingedly joined one to the other and the position of the basket in space beyond the truck is dependent on the angular relation between the beams themselves and the truck. One hydraulic cylinder is usually interposed between the lower beam and the mast assembly for controlling the angular relation between such beam and the mast of the truck, while an additional hydraulic cylinder is fastened between the two beams to vary the angular relation therebetween. Such a construction permits the top beam to move no further than approximately 160 degrees with respect to the lower beam and, consequently, limits the usefulness of the device. Moreover, with such a limitation the basket cannot be lowered to extend laterally from the truck or brought in close proximity with the ground where the workman can temporarily step out. Other articulated beam devices utilize a cable or wire rope wrapped around a sheave journaled on the pin which hingedly connects the two beams. One end of the cable is fastened to the upper beam while the other is generally fastened to some sort of actuating mechanism such as a hydraulic cylinder or a winch rigidly secured to the lower beam. As the cable draws around the sheave, the upper beam draws away from the lower beam, and, of course, raises the basket. Such structures possess an even greater limitation as to the size of the maximum angle between the upper and lower beams, and, furthermore, are subject to frequent break downs for the forces presented at the sheave bearings cause them to wear out rapidly. Moreover, each time the mast is rotated or the angular position of either one of the beams is altered, the cable stretches and contracts, causing the basket to sway up and down, so to speak, at the end of the upper beam. This swaging action obviously presents an extremely hazardous condition for the workman in the basket if he is near a dangerous object, such as a high voltage transmission line, which is often the case.

Many aerial platform units, as well as general derricks, power shovels, and the like, employ a worm gear mechanism for rotating the mast and thereby varying the horizontal angular position of the basket with respect to the truck. Worm gears permit precise positioning, but lock the mechanism and, consequently, damage easily when the driven component, namely the mast, is subjected to an outside force. For example, if, for some reason, the truck moves while the beams were extended laterally beyond the side of the truck, thereby bringing one of the beams in contact with a tree or pole, the worm gear would prevent the mast from rotating with consequent damage to the gear train or one of the beams. Similarly, if the operator or workman at the controls in the basket inadvertently failed to shut the lateral control off at the proper time and thereby brought the basket or one of the beams into contact with a tree or pole, the same result would ensue.

To prevent damage to the gear train as well as the beams, various attempts have been made to utilize spur gears, but such gears do not lend themselves to precise positioning in that the large inertial torque developed by the gear train and beams tends to carry the mast around beyond the point at which the control is shut off. Of course, an angular displacement of just a few degrees attributed to the inertial torque of the gear system and beams may mean a lineal displacement of the basket amounting to several feet, if the beams are in the extended position. This is highly undesirable as well as hazardous.

It is, therefore, the primary object of the present invention to provide an aerial platform unit which is highly versatile in operation and can be quickly and efficiently swung from an inoperative carrying position to various work positions.

It is another object of the present invention to provide an aerial platform unit of the type stated which is uniquely adapted for precise positioning of the aerial work platform by manipulation of controls mounted on the work platform itself.

It is a further object of the present invention to provide an aerial platform unit of the type stated which may be mounted on a mobile platform such as a truck and which is capable of vertical and horizontal swinging movement.

It is also an object of the present invention to provide an aerial platform unit of the type stated which is constructed in a single unit and equipped with outriggers so that the single unit can be suitably mounted on truck frames of various automotive manufacturers.

It is an additional object of the present invention to provide an aerial platform unit of the articulated beam variety in which the beams can move from an inoperative carrying position in which they are in substantially side-by-side relation to a completely extended position in which the angular relation between the beams exceeds 180 degrees.

It is another object of the present invention to provide an aerial platform unit which is simple and rugged in construction and economical to manufacture.

It is a related object of the present invention to provide a mast assembly for aerial platform units, derricks, and the like, which lends itself to precise angular positioning.

It is a further related object of the present invention to provide a mast assembly of the type stated which cannot be damaged by unauthorized outside forces applied to a beam or other member carried thereby.

Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

Corresponding reference characters indicate corresponding parts through the several views of the drawings.

Figure 1:
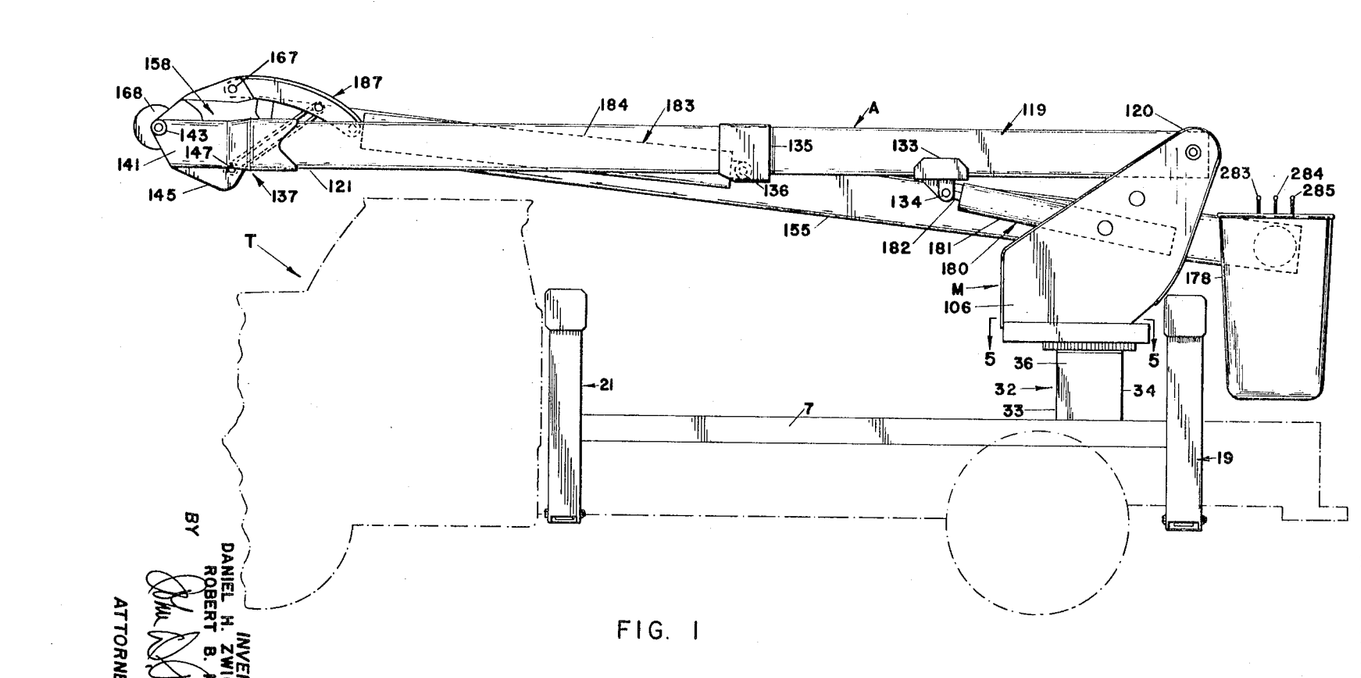
FIG. 1 is a side elevational view of an aerial platform unit constructed in accordance with and embodying the present invention, the unit being suitably mounted on a truck body shown in dotted lines.

Referring now in more detail and by reference characters to the drawings, which illustrate a preferred embodiment of the present invention, A designates an articulated aerial platform unit which is suitably mounted on a conventional truck T, the latter being shown in dotted lines in FIG. 1. The truck T is provided with a pair of lengthwise extending frame members 1 to which is welded or otherwise suitably fastened a support frame 2 having spaced lengthwise extending angles 3, 4, which are adapted for facewise securement to the side faces of the truck frame members 1. Rigidly fastened to the top faces of the angles 3, 4, at each of their ends are transversely extending end channels 5, 6. Interconnecting the end channels 5, 6, immediately above the truck frame members 1, are lengthwise extending side channels 7, 8, and immediately inwardly from the end channels 5, 6, the channels 7, 8 are interconnected by transversely extending channels 9, 10, respectively. Welded to the outwardly presented lateral faces of the lengthwise extending side channels 7, 8 so as to form outwardly projecting extensions of the channel 9 are protruding frame members 11. The frame 2 is similarly provided at its opposite end with protruding frame members 12, which, in effect, form extensions of the channel 10. Welded to the respective end margins of the channels 9, 10, 11, 12 are four depending plates 13 having inwardly projecting flanges 14 which lend rigidity thereto, and angularly interconnecting the vertical flange of the angles 3, 4, and the rearwardly presented faces of the plate 13 are gusset members 15. Transversely connecting the side channels 7, 8, at uniformly spaced intervals between the channels 9, 10, is a plurality of intermediate channels 16 which are bisected by a tubular member 17, the latter extending through the center ribs of the former.

Operatively mounted on the outwardly presented faces of each of the plates 13 are outrigger assemblies 18, 19, 20, 21, which are identical in every respect, excepting, of course, their respective locations on the base frame 2. Therefore, only the outrigger 18 will be described in detail herein.

The outrigger 18 includes an outrigger bracket member 22 which is rigidly bolted or otherwise fastened to the plate 13 and is provided with spaced parallel upper and lower pins 23, 24, respectively, the axes of which are horizontally disposed and presented parallel to the face of the plate 13. Pinned at one end of the lower pin 24 is an outrigger link 25 having at its other end a bifurcated member 26 which retains a pin 27 in spaced parallel relation to the pins 23, 24 of the bracket member 22. Journaled on the pin 27 at its one end is a double-acting hydraulic cylinder 28 having an extensible piston rod 29 projecting coaxially from its other end, the piston rod 29 being journaled at its free end on the upper pin 23 of the bracket 22. Also hingedly secured to the pin 27 is a foot plate 30 including bifurcation forming mounting plates 31 which straddle the hydraulic cylinder 28 and fit between the legs of the bifurcated member 26. The mounting plates 31 should be of such a configuration so as to permit the foot plates 30 to be presented vertically when the outriggers are in the stored or retracted position, as illustrated in FIG. 3.

Figure 3:
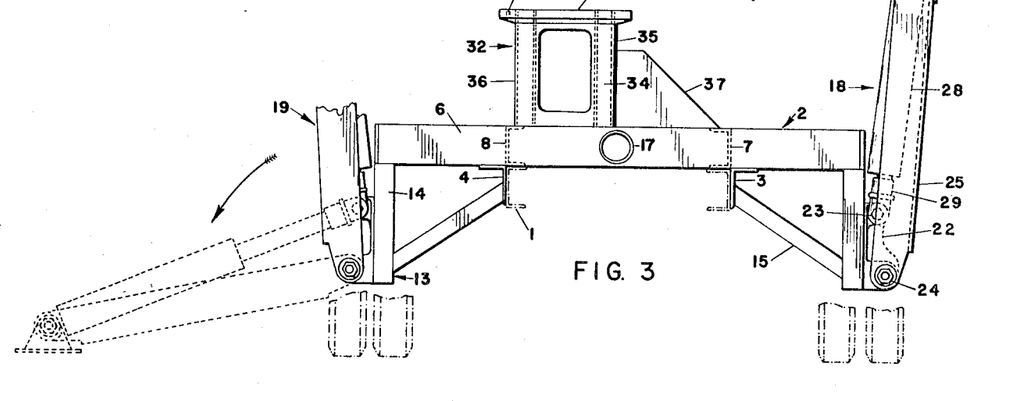
FIG. 3 is a rear elevational view of the support frame, the outrigger forming a part thereof being shown in dotted lines in the extended position.

When fluid is pumped under pressure into the hydraulic cylinder 28, the piston rod 29 extends causing the link 25 to swing outwardly as indicated by the dotted lines in FIG. 3. As the foot plate 30 swings downwardly, its own weight causes it to assume a substantially horizontal position for engagement with the ground. The outriggers 18, 19, 20, 21, of course, lend stability to the truck T and, being conventional in design and manufacture, will not be described herein in further detail.

The upper coplanar surfaces of the frame 2 can be covered with relatively thin gauge steel plate or any other suitable decking (not shown).

Figure 2:
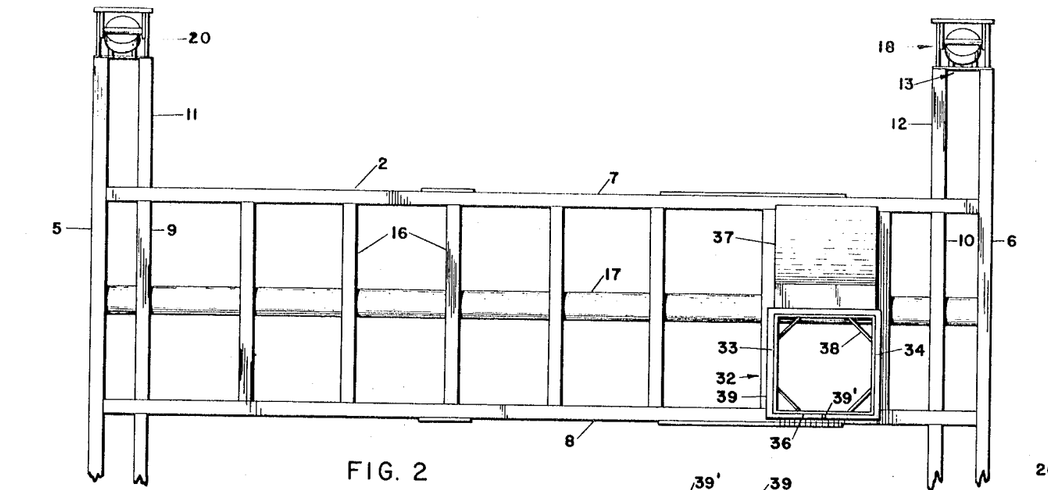
FIG. 2 is a fragmentary top plan view of a support frame forming part of the present invention.

At its rear, that is to say, the right hand side as seen in FIGS. 1 and 2, the frame 2 is provided on is left side with an upwardly presented pedestal-like lower mast assembly 32, including front and rear walls 33, 34, respectively, which extend below the upper faces of the side channels 7, 8, where they are welded to the opposed vertical faces of the two rearmost intermediate channels 16. Transversely connecting the walls 33, 34 to form a box-like structure are inner and outer side walls 35, 36, which extend no lower than the upper faces of the side channels 7, 8, and intermediate channels 16. Additionally, welded to the opposed vertical faces of the two rearmost intermediate channels 16 and projecting perpendicularly from the inner side wall 35 are gusset plates 37 which lend additional support to the pedestal 32. Internally at its corners, the pedestal 32 is provided with a plurality of corner braces 38 which are welded to the walls 33, 34, 35, 36, and maintain the pedestal 32 in a rigid rectilinear configuration.

Welded or otherwise rigidly fastened to the walls 33, 34, 35, 36 at the upper margin of the pedestal 32 in continuous embracement therewith is a flange-forming mount 39 having a horizontally disposed planar upper surface and being centrally provided on one of its sides with a somewhat enlarged aperture 39' having a vertical axis.

Figure 6:
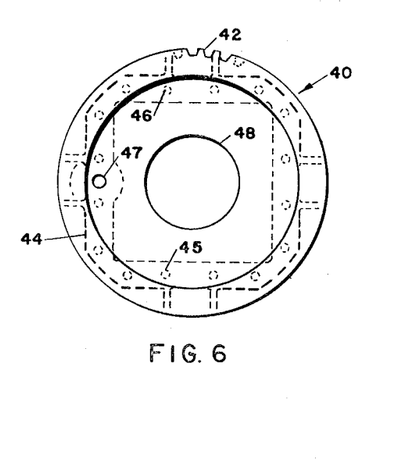
FIG. 6 is a top plan view of a rotator gear forming part of the present invention.
Figure 9:
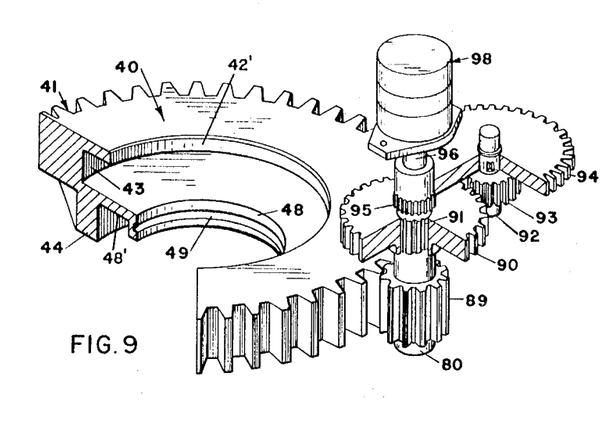
FIG. 9 is a perspective view, partially broken away and in section, of the rotator gear and gear train forming a part of the present invention.

Operatively mounted on the pedestal 32 is a rotatable upper mast assembly M including a fixed rotator gear 40 which is mounted on the pedestal 32 and securely bolted to the mount 39 thereof. Referring now to FIGS. 6 and 9, the rotator gear 40 is integrally cast and machined or otherwise formed to include a circular gear portion 41 provided on its outer periphery with conventional spur teeth 42. Internally, the gear portion 41 is relieved in the provision of an upwardly opening recess 42' and an annular groove 43 having a substantially rectangular cross-sectional shape. Integrally cast to the gear portion 41 and projecting downwardly therefrom is a substantially rectangular rim-like base portion 44, the outer margins of which register with the outer margins of the flange-forming mount 39. The base portion 44 is provided with a planar underface which is adapted for facewise abutment with planar upper surface of the mount 39. The base portion 44 is further provided with a plurality of tapped holes 45 adapted to receive bolts 46 which extend through the mount 39 and rigidly secure the rotator gear 40 to the pedestal 32. On one of its sides, the base portion 44 is bored or otherwise provided with an enlarged axially extending threaded aperture 47 which terminates in close proximity to the inwardly presented margin of the annular groove 43. The enlarged aperture 47 accepts a plug 47' and registers with the aperture 39' in the mount 39, all for purposes presently more fully appearing.

Finally, the rotator gear 40 integrally includes an inwardly extending web 48' which is centrally provided with an aperture 48. Aperture 48 is an upwardly opening bore, the wall of which is relieved in the provision of a groove 49 which carries an O-ring 50.

Figure 4:
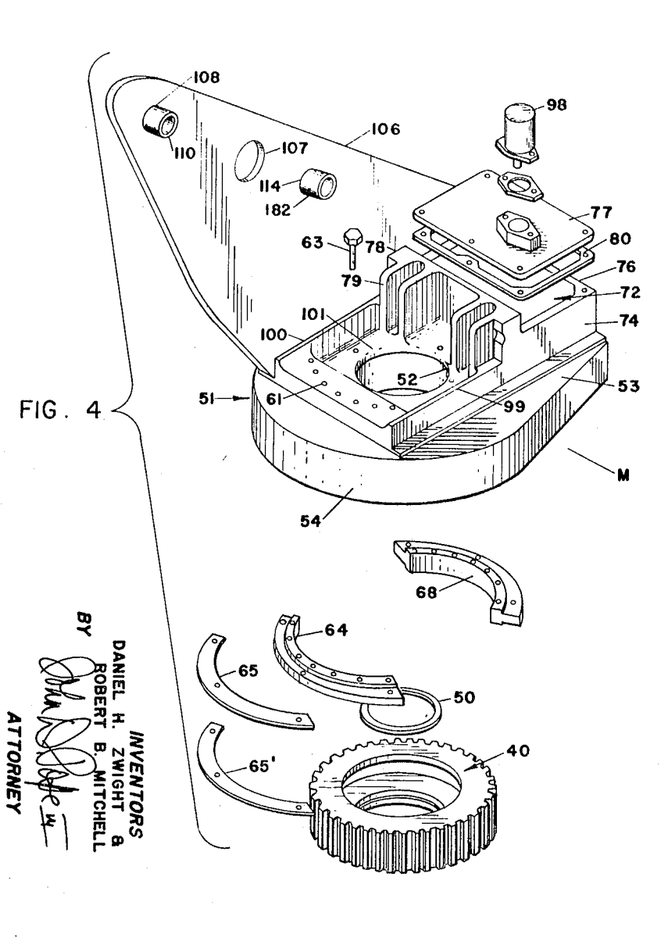
FIG. 4 is an exploded perspective view of a mast assembly forming part of the present invention.
Figure 5:
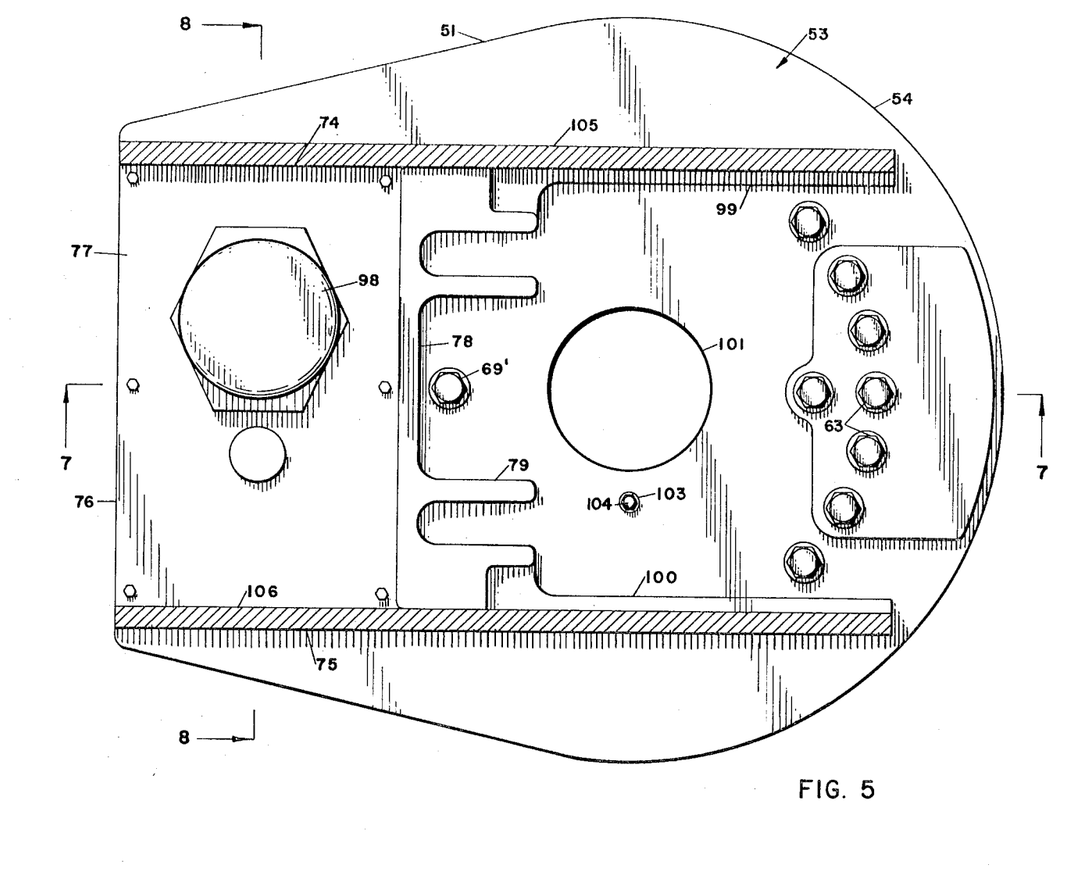
FIG. 5 is a sectional view taken along line 5—5 of FIG. 1.

Rotatably mounted on the rotator gear 40 is a turret casting 51 which is preferably cast from steel in the configuration best illustrated in FIGS. 4 and 5. The turret 51 is provided with a downwardly projecting hub 52 which fits snugly but rotatably within the enlarged center aperture 48 of the gear 40 where it is embraced by the O-ring 50, thereby forming a fluid tight seal therebetween, reference being made to FIG. 7. Outwardly from the hub 52, the turret 51 is provided with a top wall 53 which terminates at a downwardly depending side wall 54, the latter being concentric to the hub 52 through an arc exceeding 180 degrees. The side wall 54 completely shields the gear 40 and extends outwardly on one side away from the gear 40 in the provision of a gear box 55. Concentrically disposed to the hub 52 in outwardly spaced relation thereto and integrally cast to the undersurface of the top wall 53 is a downwardly projecting annular rim 56 having a horizontal planar underface 57 which is presented slightly below the upper margin of the groove 43 of gear 40. Outwardly from the rim 56 the top wall 53 is relieved on its underface in the provision of an annular groove 58 having a rectangular cross section, the groove 58 being sized to snugly receive a circular seal 59 formed from any suitable elastomeric material. The seal 59 and O-ring 50 permanently seal a somewhat annular cavity 60 defined on its top and bottom by the top wall 53 of the turret 51 and base portion 44 of gear 40, respectively. The inner and outer limits of the cavity 60 are respectively defined by the hub 52 of the turret 51 and the circular gear portion 41 of the gear 40.

Diametrally opposite gear housing 55, the top wall 53 is drilled in the provision of a plurality of arcuately spaced apertures 61 which extend through the rim 56 in close proximity to its outer margin. Radially inwardly from the center of the arc defined by the apertures 53, the top wall 53 is provided with an aperture 62 which extends axially through the rim 56 in close proximity to its inner margin. Apertures 61, 62, accept bolts 63 which are threaded into and securely fasten an arcuate shoe support 64 to the planar underface 57 of the rim 56. The shoe support 64 projects radially outwardly from the rim 56 and into the annular groove 43 of the gear 40 where it is provided on its top and bottom surfaces with shoes 65, 65', respectively, the shoes 65, 65', being bolted, brazed, riveted or otherwise securely fastened thereto. The shoes 65, 65', are fabricated from any suitable material such as bronze and snugly, but slidably, engage the upper and bottom faces of the groove 43. Shoe support 64 together with its shoes 65, 65', forms a guide element which projects into groove 43.

Figure 7:
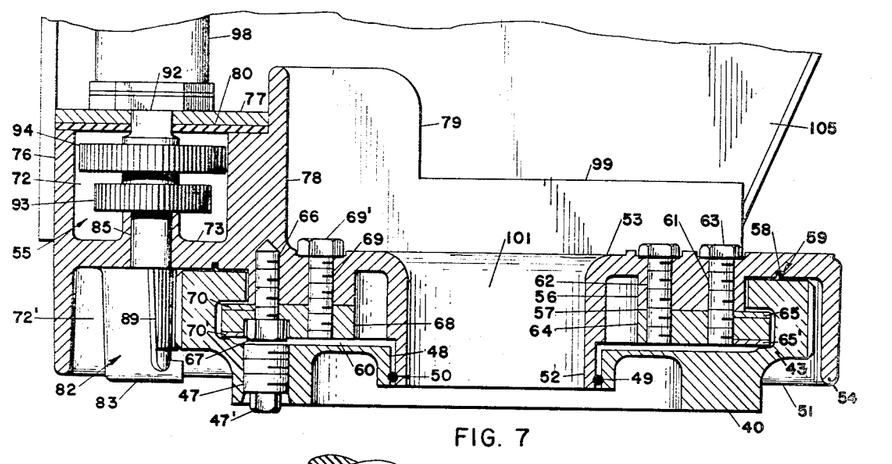
FIGS. 7 and 8 are sectional views taken along lines 7—7 and 8—8, respectively, of FIG. 5.

Diametrally opposite the arcuate apertures 61, the rim 56 is provided near its outer margin with a plurality of arcuately spaced threaded apertures 66, all of which open downwardly and successively register with the aperture 47 in the gear 40 as the turret 51 is rotated. The apertures 66 accept bolts 67 which rigidly fasten an arcuate shoe support 68 to the planar underface 57 of the rim 56, the shoe support 68 being provided with counterbored holes which receive the heads of the bolts 67. Inwardly from the center of the arc defined by the apertures 66, the top wall 53 is drilled in the provision of an aperture 69 which accepts a bolt 69', the latter of which is threaded into the shoe support 68 and lends additional rigidity thereto. The shoe support 68 similarly projects outwardly into the groove 43 where it is provided with upper and lower shoes 70, 70', which bear respectively against the upper and lower surfaces of the groove 43. Shoe support 68 together with its shoes 70, 70' also forms a guide element. When desired, as best seen in FIG. 7, access to the bolts 67 can be gained through the aligned apertures 47, 39', of the gear 40 and mount 39, respectively.

As has been previously noted, the turret 51 is provided at its one end with a gear box 55, the lower portion of which is partially defined by the side wall 54. The gear box 55 is divided into upper and lower portions 72, 72', respectively, by an intermediate wall 73 which is, in effect, a continuation of the top wall 53. Upper portion 72 is a substantially rectilinear cavity defined by parallel side walls 74, 75, and an end wall 76, all having coplanar upper margins to which a cover plate 77 is bolted. Integrally cast inwardly and opposite from the end wall 76 is a center wall 78 which serves as the opposite end wall for the upper portion 72 on its outwardly presented side. On its opposite or inwardly presented side, the center wall 78 is provided with a plurality of integrally cast gusset-forming protuberances 79 which lend rigidity to the turret casting 51. Interposed between the cover plate 77 and the upper margins of the walls 74, 75, 76 is a gasket 80 which is fabricated from any suitable gasket material. It should be noted that the end wall 76 extends downwardly below the upper portion 72 and transversely connects the end margins of the side wall 54, thereby, in effect, serving as an end wall for the lower portion 72'.

Intermediate wall 73 is provided in slightly offset relation to its center with an enlarged aperture 81, the axis of which is parallel to, and spaced outwardly from, the teeth 42 of gear 40. Cast integral to the intermediate wall 72 and depending therefrom into the lower portion 72' of gear box 55 in surrounding relation to the aperture 81 for portion of its circumference is a gear support 82 of arcuate cross-sectional shape which terminates in a circular base 83, the latter being provided with a circular aperture 84 axially aligned with the aperture 81. To one side of the aperture 81 the intermediate wall 72 is additionally provided with an aperture 85. Finally, the cover plate 77 is provided with apertures 86, 87, which register and axially align with the apertures 84, 85, respectively.

Figure 8:
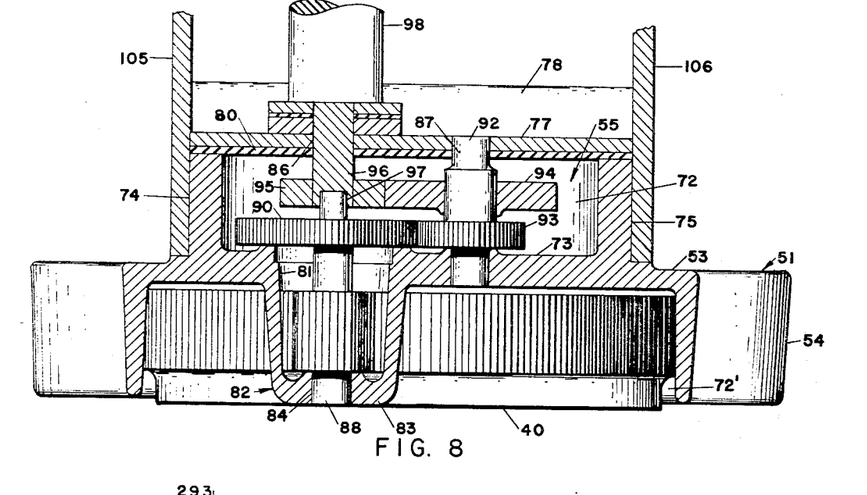

Journaled in the aperture 84 and extending through the aperture 81, as will be seen by reference to FIG. 8, is a gear shaft 88 which, at one end, carries a pinion gear 89, the gear 89 being sized and located to mesh with the teeth 42 of the stationary gear 40. At its other or upper end, the shaft 88 is fitted with a diametrally enlarged spur gear 90, which rotates above, but in close proximity to, the intermediate wall 73. Upwardly, beyond the gear 90, the shaft 88 is turned down in the provision of a spindle 91, for purposes presently more fully appearing. Journaled within the apertures 85, 87 of the intermediate wall 73 and cover plate 77, respectively, is a shortened gear shaft 92 having a pinion gear 93 rigidly fastened thereto for engagement with spur gear 90. Also fastened to the shaft 92 immediately above the pinion gear 93 is an enlarged spur gear 94, which radially extends over the top surface of the spur gear 90 where it meshes with a pinion gear 95, the pinion gear 95 being rigidly fastened to a drive shaft 96 which extends through the aperture 86 in the cover plate 77. At its lower end, the drive shaft 96 is axially bored in the provision of a cylindrical recess 97 which rotatably receives the spindle 91. The drive shaft 96 is part of a reversible hydraulic motor 98 which is bolted to the cover plate 77. Since the hydraulic motor 98 is conventional in design and manufacture, it will not be described or illustrated herein in further detail.

The side walls 74, 75 are extended across the top wall 53 in the provision of upwardly projecting flanges 99, 100, and interposed therebetween is an enlarged aperture 101 which extends through the hub 52. To one side of the aperture 101 the top wall 53 is provided with a small threaded aperture 103 which communicates with the cavity 60 for introducing a heavy oil or other suitable lubricating medium into the same. Threaded into the aperture 103 is a conventional plug 104. Since the shoes 65, 65', 69, 69' engage the upper and lower surfaces of the groove 43 in the lubricating medium, wear is greatly reduced with a resultant reduction in maintenance costs.

Welded to the flanges 99, 100 of the turret 51 are upstanding spaced parallel mast ears 105, 106, which are transversely connected intermediate their ends by a cross member 107. At their upper ends, the mast ears 105, 106 are provided with axially aligned apertures 108, 109 into which are fitted sleeves 110 111, the sleeves 110, 111 being rigidly fastened to the ears 105, 106. Fitted through the sleeves 110, 111, and rigidly affixed thereto, is a beam supporting shaft 112 which has a leveling sprocket 113 firmly secured thereto in slightly offset relation to the center thereof, all for purposes presently more fully appearing. Intermediate the cross member 107 and turret 51, the mast ears 105, 106 are provided with axially aligned apertures 114, 114', into which are fitted sockets 115, 116, each having outwardly projecting flanges 117 which are bolted to the outer faces of the ears 105, 106. Welded or otherwise rigidly fastened to the outwardly presented face of the ear 105 for purposes presently more fully appearing is an outer beam carrying support 118.

Figures 14, 21:
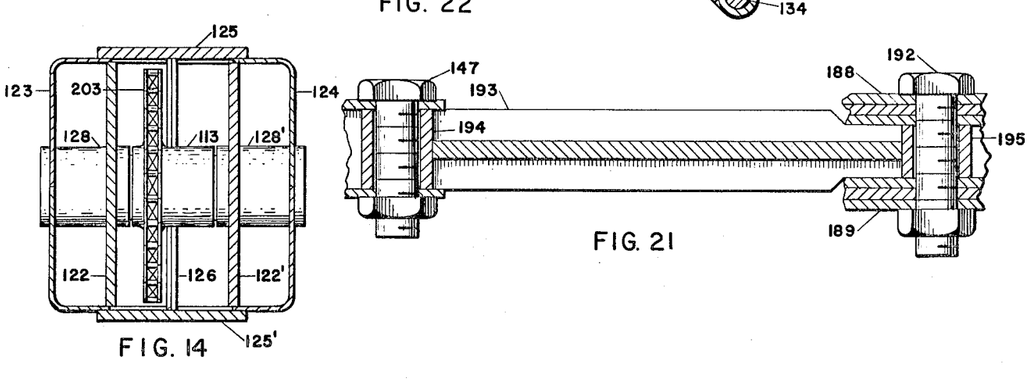
FIGS. 19, 20, and 21 are sectional views taken along lines 19—19, 20—20, and 21—21, of FIG. 18.

Referring now to FIG. 1, the mast assembly M carries an articulated beam assembly R including a tubular inner beam 119 having inner and outer ends 120, 121, respectively, and preferably fabricated from steel or some other suitable rigid material. At its inner end, the beam 119 is provided with longitudinally extending intermediate members 122, 122', between which the top and bottom surfaces of the beam 119 are cut away in the formation of bifurcation legs 123, 124. Welded respectively to the top and bottom surfaces of the legs 123, 124 in interconnecting relation therewith are top and bottom plates 125, 125' which are connected by a center member 126, the center member 126 being interposed between the intermediate members 122, 122'. Extending through the bifurcation legs 123, 124 and rigidly secured therein are bushings 128, 128', which rotatably receive the beam supporting shaft 112 and fit between the sleeves 110, 111, the sprockets 113 being interposed therebetween in registration with the channel formed by the intermediate member 122 and center member 126, as best seen in FIG. 14. The inner beam 119 is thus hingedly mounted on the mast assembly M at the shaft 112.

The bifurcation leg 123 is internally fitted with two removable dowels 129, 130, the axes of which are in spaced parallel relation. Rotatably mounted on the dowels 129, 130, between the intermediate member 122 and center member 126, are idler sprockets 131, 132, respectively, which are in coplanar registration with the sprocket 113.

Welded or otherwise rigidly fastened to the under and side faces of the beam 119 in outwardly spaced relation to the idler sprockets 131, 132 is a bifurcated saddle-like bracket 133 which is fitted with a pin 134. Interposed between the bracket 133 and outer end 121 and also welded to the beam 119 is a collar 135 having a cylindrical lug 136 which projects horizontally therefrom perpendicular to the side faces of the beam 119.

At its outer end, inner beam 119 is fitted with a hinge member 137 preferably cast or otherwise formed in the configuration best seen in FIGS. 1, 10, 15, and 25. Hinge member 137 includes a laterally offset body portion 138 having a socket portion 139 extending therefrom which is internally sized to snugly receive the outer end 121 of the inner beam 119, the socket portion 139 being preferably welded along its outer margins to the outer walls of the beam 119 or otherwise rigidly fastened thereto. Cast integrally to and projecting outwardly from the opposite end of the body portion 138 are spaced parallel legs 140, 141 having axially aligned apertures 142, 143, respectively, into which a hinge pin 144 is rotatably fitted, the hinge pin 144 projecting outwardly beyond the outer face of the leg 140, but being substantially flush with the outer face of the leg 141. It should be noted that irrespective of the position of beam 119, the axis of the hinge pin 144 will always be parallel to the beam supporting shaft 112. Body portion 138 is centrally provided with downwardly projecting bifurcated link-receiving portion 145 into which a pin 147 is removably fitted. The body portion 138 is relieved in close proximity to the leg 141 in the provision of an aperture 148 which communicates with the socket 139 and the internal portion of the beam 119. Interposed between the socket 139 and aperture 142 and extending transversely through the aperture 148 in close proximity to its upper surface is a dowel 149 which rotatably carries an idler sprocket 150 in coplanar relation to the idler sprockets 131, 132, and drive sprocket 113, the sprocket 150 being vertically positioned from the top wall of the beam 119 a distance substantially equal to that of the sprocket 131.

Figures 10, 13, 15, 16, 17:
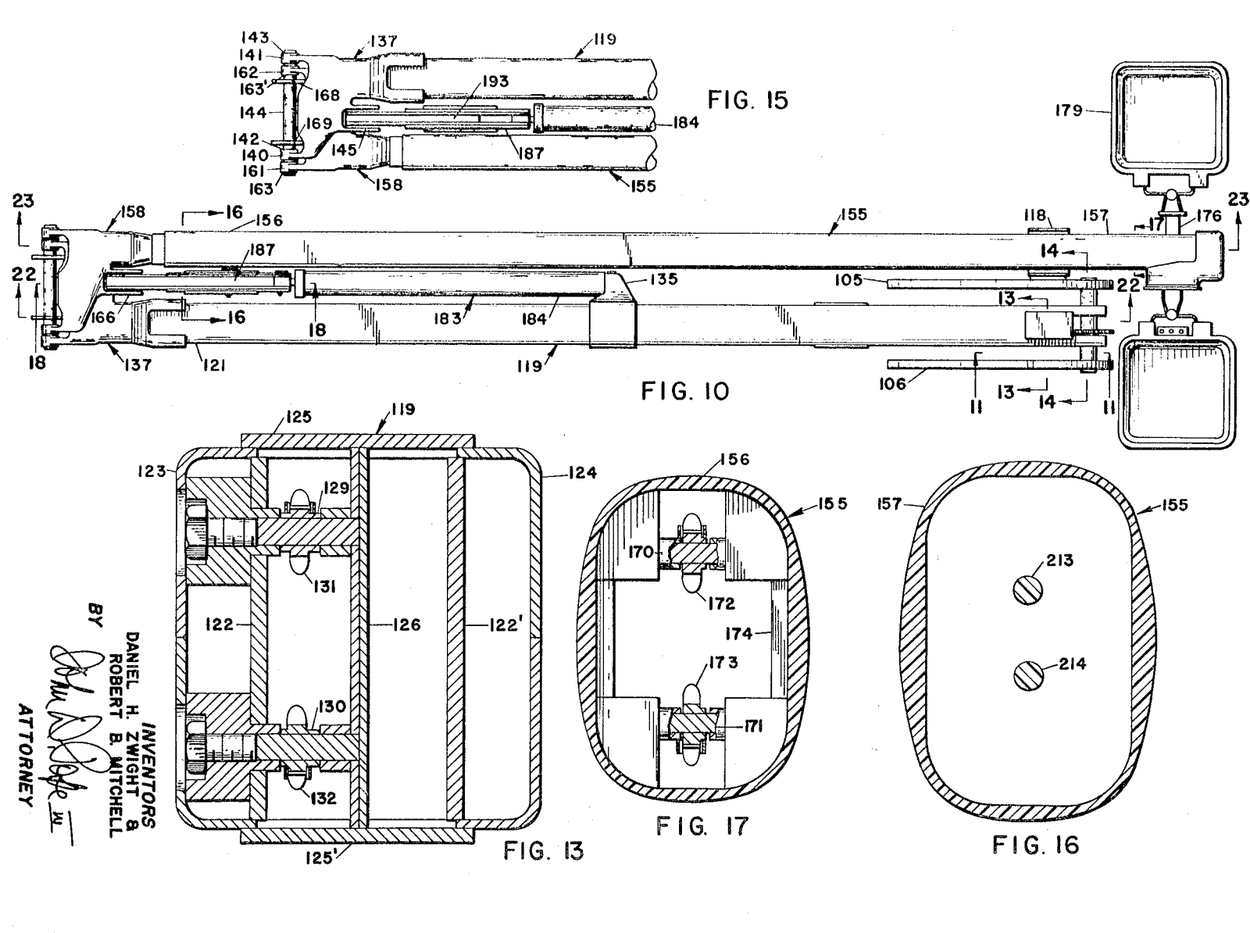
FIG. 10 is a top plan view of the articulated beam and mast assemblies constructed in accordance with and embodying the present invention.
FIGS. 13 and 14 are sectional views taken along lines 13—13 and 14—14, respectively, of FIG. 10.
FIG. 15 is a fragmentary bottom plan view of the articulated beam assembly.
FIGS. 16, 17, and 18 are sectional views taken along lines 16—16, 17—17, and 18—18, respectively, of FIG. 10.
Figure 11:
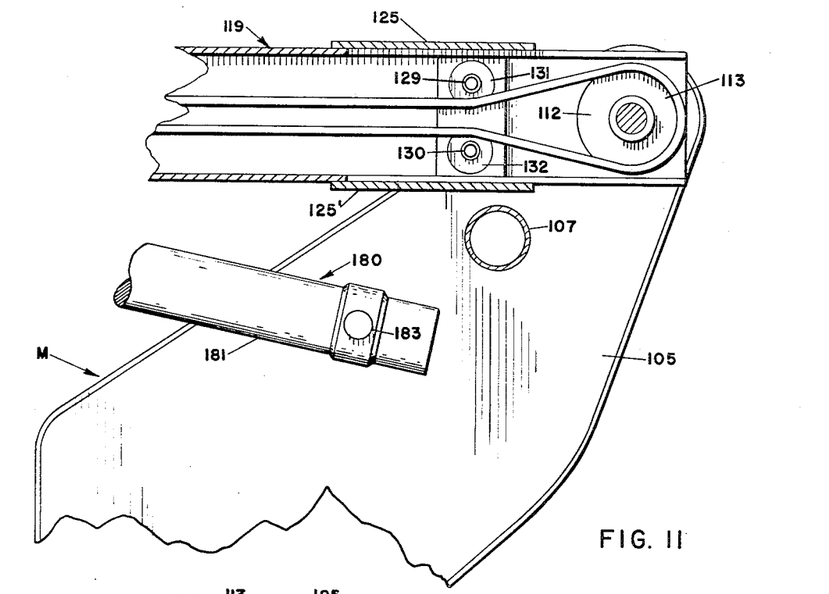
FIG. 11 is a sectional view taken along line 11—11 of FIG. 10.
Figure 12:
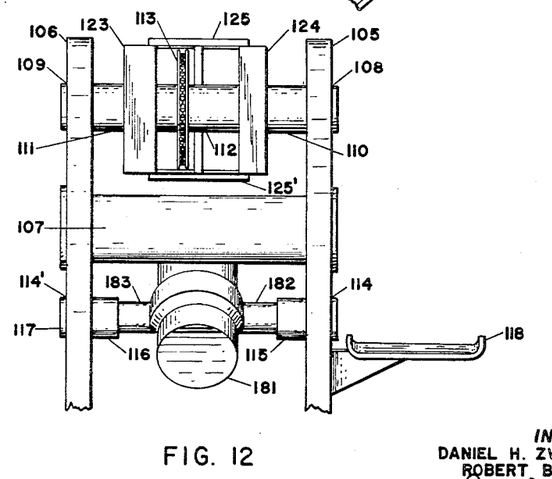
FIG. 12 is a rear elevational view of the mast assembly.

Hingedly joined to the inner beam 119 at the hinge pin 144 is a tubular outer beam 155 of oval or somewhat elliptical cross-sectional shape having inner and outer ends 156, 157, respectively, and being molded or otherwise formed from fiberglass or some other suitable high dielectric material. At its inner end 156, the outer beam 155 is provided with a hinge member 158 which is very similar in configuration to the hinge member 137 and includes a laterally offset body portion 159 having a protuberance 160 of oval cross-sectional shape projecting therefrom for endwise insertion in the inner end 156 of the outer beam 155. Projecting outwardly from the other side of the body portion 159 are widely spaced parallel legs 161, 162 having axially aligned apertures 163, 163', respectively, which rotatably receive the hinge pin 144, the inner face of the leg 162 being in facewise rotatable abutment with the outer face of the leg 141 and the outer face of the leg 161 being in facewise rotatable abutment with the inner face of the leg 140, all as best seen in FIG. 10. Providing communication with the interior of the beam 155 is an aperture 164 which extends through the body portion 159. Transversely extending across the aperture 164 is a dowel 164' which rotatably carries an idler sprocket 165, the sprocket 165 being located in close proximity to a line defining the bottom most extremity of the interior surface of the beam 155, reference being made to beam 155 when it is in the carrying position illustrated in FIG. 1. On its upper surface, reference again being made to the beam 159 in the carrying position, the body portion 159 is centrally provided with an upwardly presented bifurcated link-receiving portion 166 having arms into which a pin 167 is fitted. As will be seen by reference to FIGS. 10 and 15, the respective centerlines of the bifurcated portions 145 and 166 are disposed in substantially the same plane irrespective of the angular relation between the beams 119, 155. Moreover, since the socket portion 139 and protuberance 160 are offset to one side on their respective body portions, the centerlines of the beams 119, 155, will never intersect, nor will movement of one beam bring it into contact with the other beams. When the beams 119, 155, move, as will subsequently be described in greater detail, the centerlines of each will trace spaced parallel planes.

At this juncture, it should be pointed out that the hinge pin 144 is rigidly provided with spaced leveling sprockets 168, 169, which are in coplanar registration with the idler sprockets 150, 165, respectively, and diametrally equal to the sprocket 113, all for purposes presently more fully appearing. Moreover, the pin 144 is free to rotate within the apertures 142, 143, and 163, 163' of the hinge members 137, 156, respectively.

Near its outer end 157, reference being made to FIG. 17, the outer beam 155 is internally provided with transversely ending parallel dowels 170, 171, which carry idler sprockets 172, 173, respectively, the sprockets 172, 173 being in coplanar registration with the sprockets 165, 169. At its outer end 157, the beam 155 is internally fitted with reinforced blocks 174 having axially aligned apertures 175' through which extends an end shaft 176 for rotation therein. Rigidly fastened to the end shaft 176 within the beam 155 is a leveling sprocket 177 which is diametrally equal to the sprocket 169 and aligns with the sprockets 165, 169, 172, 173. Conventionally fastened to each end of the end shaft 176 are baskets 178, 179, which are preferably molded or otherwise formed from a high dielectric material such as fiberglass.

Operatively interposed between the mast ears 105, 106, and bifurcated bracket 133 is a conventional double-acting hydraulic cylinder 180 including a barrel 181 provided intermediate its ends with axially aligned trunnions 182, 183, which fit rotatably within the sockets 115, 116, respectively. Projecting from one end of the barrel 181 for extensible movement from a retracted position to extended positions is a piston rod 182 which is hingedly secured at its outermost end to the bracket 133 by the pin 134. Thus, any extension of the piston rod 182 will cause the inner beam 119 to rise and similarly if the piston rod 182 is retracted into the barrel 181, the beam 119 will depress.

Figures 18, 19, 20:
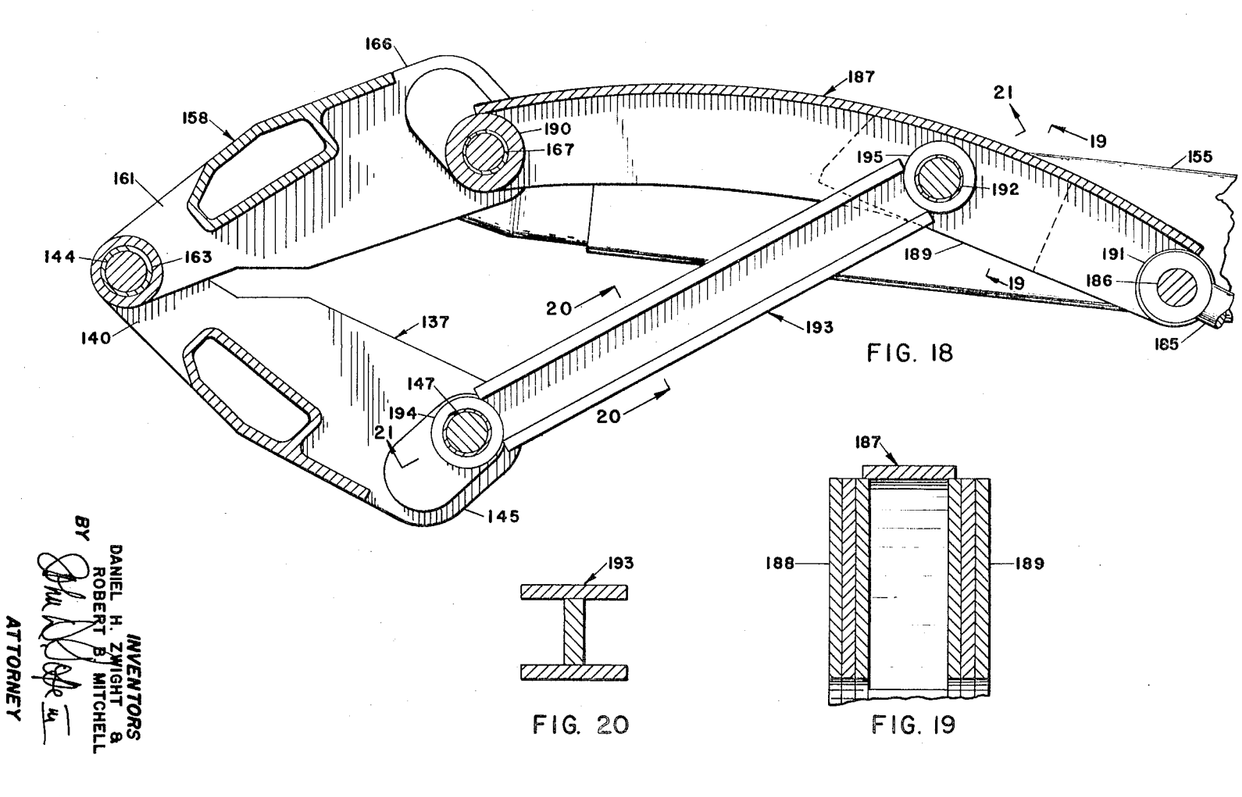

The lug 136 of collar 135 carries one end of a conventional double-acting hydraulic cylinder 183 including a barrel 184 and a piston rod 185, the barrel 184 being hingedly fastened at its closed end to the lug 136. The outermost end of the piston rod 185 is hingedly secured by means of a pin 186 to an arcuately shaped link 187 having laminated side walls 188, 189, separated at their ends by bushings 190, 191, the latter of which accepts the pin 186. At its opposite end, the arcuate link 187 is hingedly fastened to the hinge member 158 by the pin 167 of bifurcated link-receiving portion 166, the pin 167 being passed through the bushing 190 of link 187. Intermediate its ends, the link 187 is provided with a pin 192, the axes of which are parallel to the axes of the bushings 190, 191. Interconnecting the link 187 and hinge member 137 is a lower link 193 having an I-shaped cross-section, as best seen in FIG. 20. At its ends, the lower link 93 is provided with bushings 194, 195, the former of which receives the pin 147 of bifurcated link-receiving portion 145 and the latter of which fits between the laminated side walls 188, 189, where it receives the pin 192 of link 187.

Figures 24, 25, 26, 27:
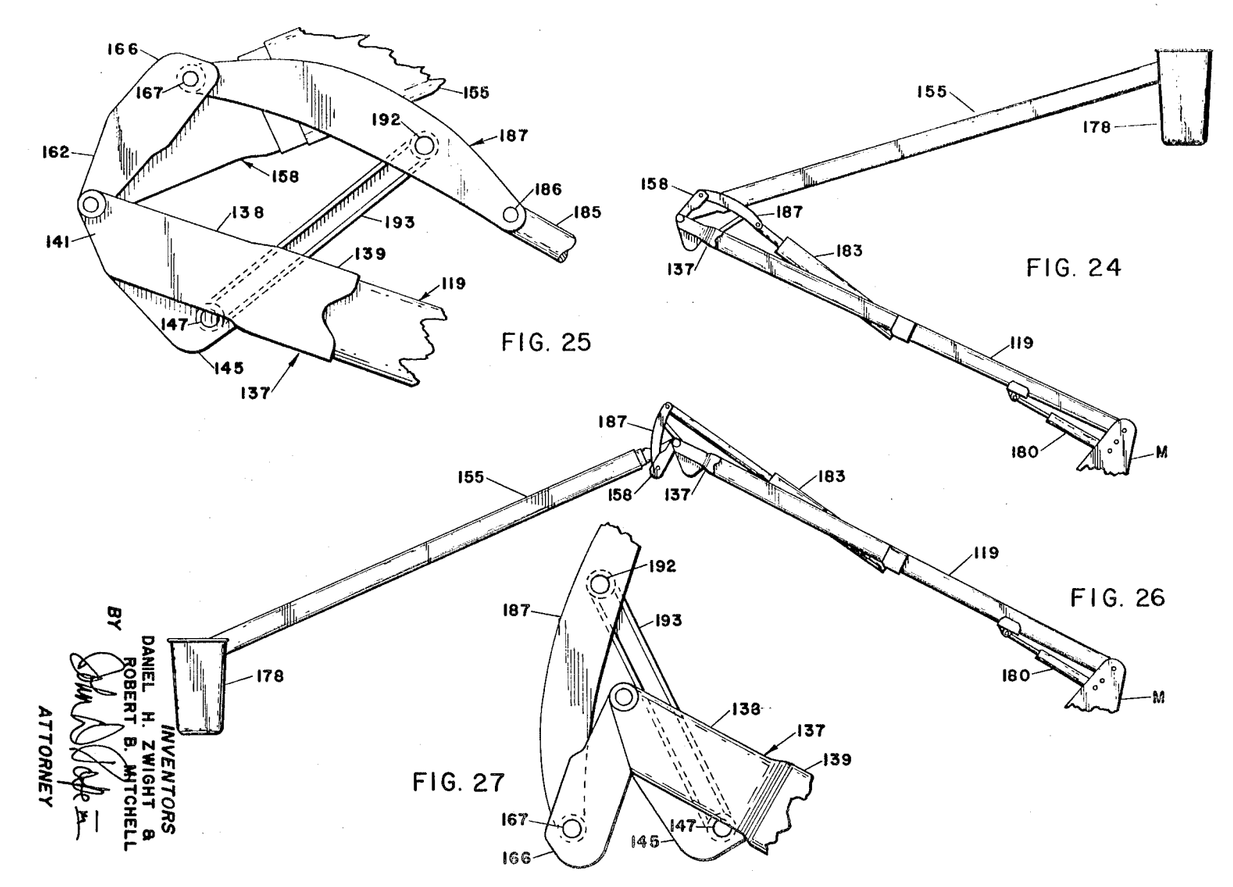
FIG. 24 is a side elevational view of the articulated beam assembly in a partially elevated position.
FIG. 25 is an enlarged elevational view showing the linkages forming part of the present invention when the articulated beam assembly is in the position illustrated in FIG. 24.
FIG. 26 is a side elevational view showing the articulated beam assembly in the fully extended position.
FIG. 27 is an enlarged sectional view showing the linkages when the articulated beam assembly is in the position illustrated in FIG. 26.

As will be seen by reference to FIGS. 24 through 27, as the piston rod 185 extends, the angle between the hinge members 137, 158, will increase, thereby increasing the angular relation between the inner beam 119 and outer beam 155. The unique linkage system allows the outer beam 155 to move from a carrying position in which the inner beam 119 and outer beam 155 are substantially in side-by-side relation, reference being made to FIG. 1, through an arc of approximately 235 degrees at which point the side of the link 193 comes into contact with the hinge pin 144, as illustrated in FIG. 27.

Figure 22:
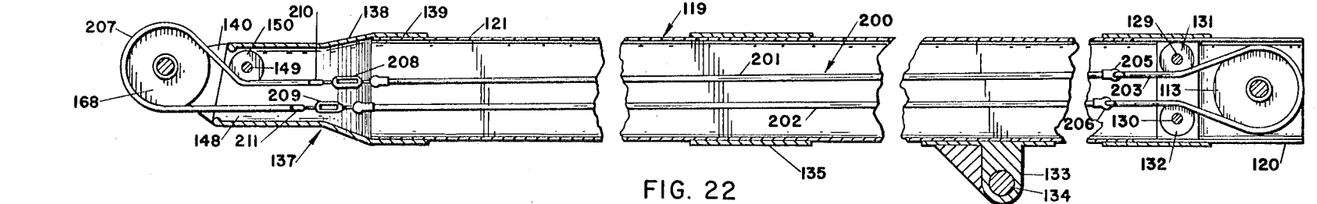
FIGS. 22 and 23 are sectional views taken along lines 22—22 and 23—23, respectively, of FIG. 10.

Referring now to FIG. 22, the lower beam 119 is internally provided with a leveling line 200 including strain rods 201, 202, which are preferably made of steel or other suitable high tensile strength material. The strain rods 201, 202 extend longitudinally within the beam 119 in spaced parallel relation and are interconnected at one of their ends a roller chain 203 which is trained around the idler sprockets 131, 132, and sprocket 113 in the configuration illustrated in FIG. 22. The chain 203 is secured at its ends to the rods 202, 203 by conventional connecting links 205, 206. At their opposite ends, the rods 202, 203 are interconnected by a roller chain 207, which is trained around the sprockets 168, 150, and interposed between the ends of the chain 207 and the rods 202, 203 are turnbuckles 208, 209 for adjusting the tension within the leveling line 200, as well as the angular relation between the sprockets 113 and 168. The turnbuckles 208, 209 are provided at one end with elastic stop nuts 210, 211, respectively, which frictionally engage the threads over which they are threaded so as to prevent unauthorized rotation of the turnbuckles 208, 209 through various outside forces such as vibrations. To adjust the turnbuckles 208, 209, one must use a tool (not shown) comprising a rod of sufficient length to fit through the aperture 148 and reach the turnbuckles 208, 209, the rod being provided at its one end with an offset portion is adapted to engage the center apertures of the turnbuckles 208, 209. Thus, a mechanic by use of such a tool can reach through the apertures 148 in the hinge member 137 and manipulate the turnbuckle 208, whereby to adjust the tension within the leveling line 200 and the angular disposition of the baskets 176, 177.

The elastic and stop nuts 210, 211 hold the turnbuckles 208, 209 in the position of final adjustment and eliminate further manipulation of lock nuts or other locking devices in such inaccessible spaces.

Figure 23:
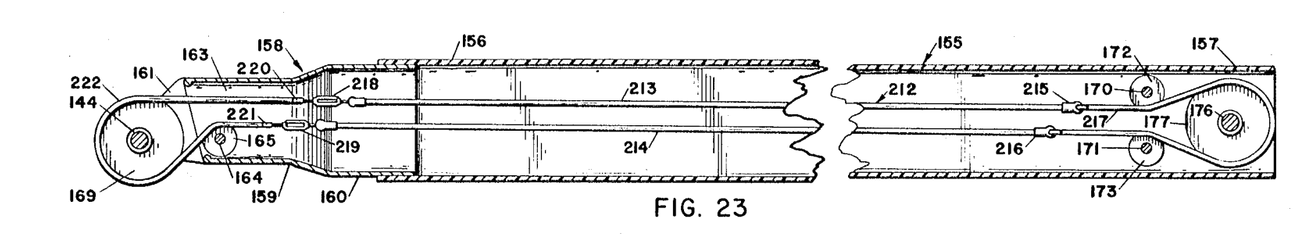

As will be seen by reference to FIG. 23, the outer beam 155 internally is provided with a leveling line 212 including strain rods 213, 214, which are preferably extruded from high tensile strength glass or other suitable high dielectric material. At the outer end 157 of the outer beam 158, the rods 213, 214 are provided respectively with conventional connecting links 215, 216 to which are fastened the ends of a roller chain 217, the chain 217 being trained around the leveling sprocket 176 and idler sprockets 172, 173. At the inner end 156 of the beam 155, the opposite ends of the rods 213, 214 are provided with turnbuckles 218, 219 having elastic stop nuts 220, 221, respectively, which function similarly to, and serve the same purpose as, the elastic stop nuts 210, 211. Interconnecting the turnbuckles 218, 219 is a roller chain 222 which is trained around the leveling sprocket 169 and idler sprocket 165. Leveling line 212 is adjusted by manipulation of the turnbuckles 218, 219 with the tool hereinbefore described, access thereto being gained through the aperture 164 in hinge member 158.

It should be noted at this juncture that the leveling lines 200, 212 are operatively interconnected by the hinge pin 144 which carries the sprockets 168, 169. Although the hinge pin 144 is free to rotate in its mounting apertures 163, 163′, 142, 143, the sprockets 168, 169 being rigidly fastened to the pin 144 do not rotate thereon and, consequently, any rotational displacement of the sprocket 168 will immediately be transferred to the sprocket 169. Moreover, the leveling sprockets 113, 177 do not rotate with respect to their respective mounts, namely, the mast M and baskets 178, 179, and, furthermore, all are diametrically equal. Thus, the baskets 178, 179 will maintain the same vertical position, that is to say, with the opening presented upwardly, irrespective of the angular relation between the inner beam 119 and outer beam 155, or the angular relation between the inner beam 119 and the mast M.

Figure 28:
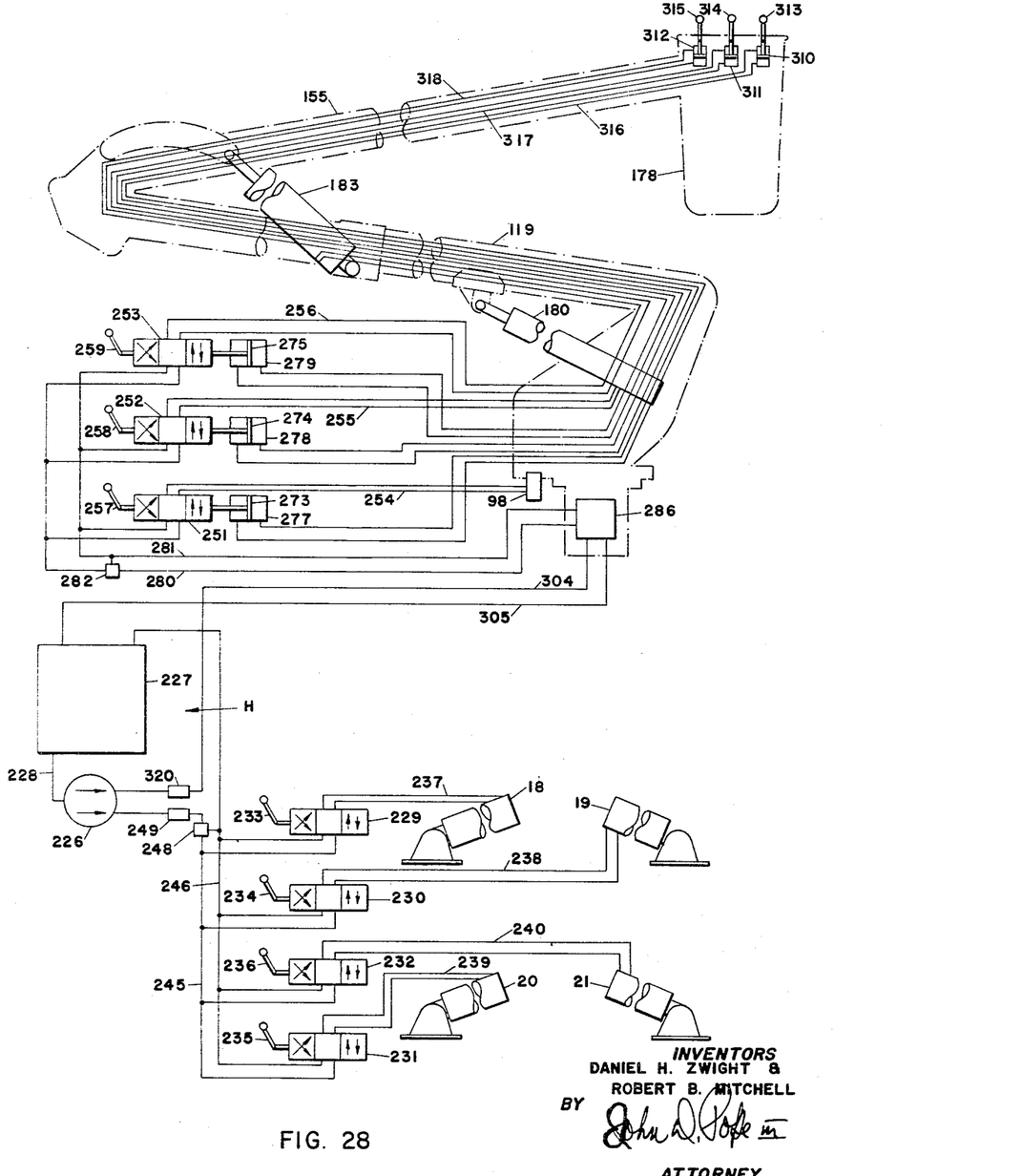
FIG. 28 is a schematic view of the control system and hydraulic circuitry forming part of the present invention.

Referring now to FIG. 28, the aerial platform A is suitably provided with a hydraulic control system H including a fluid pump motor combination 226 which is connected to a reservoir 227 by a fluid line 228.

The outriggers 18, 19, 20, 21 are independently operated through a bank of four two-way three-position control valves 229, 230, 231, 232, respectively, having handles 233, 234, 235, 236, respectively, the bank of control valves being suitably mounted on the frame 2 for easy access therefrom. The valves 229, 230, 231, 232 are connected to the outriggers 18, 19, 20, 21, respectively, through pairs of hydraulic lines 237, 238, 239, 240, respectively, and are additionally connected as schematically illustrated in FIG. 28 to a high-pressure supply line 245 and a return line 246, the former of which is connected to the pump motor combination 226 and the latter of which terminates at the reservoir 227. Interposed within the high-pressure supply line 245 as it enters the bank of control valves is a high-pressure relief valve 248 which discharges into the return line 246. The high-pressure supply line 245 is additionally provided with a filter 249.

Securely mounted on the mast assembly M and adapted for rotation with the turret 51 thereof is a bank of three two-way three-position directional control valves 251, 252, 253, which are respectively connected by pairs of hydraulic lines 254, 255, 256 to the hydraulic motor 98, the hydraulic cylinder 180 and the hydraulic cylinder 183. Each of the directional control valves 251, 252, 253 are respectively provided with handles 257, 258, 259 and outwardly extending plungers 273, 274, 275, which are connected to and operable by double-acting slave cylinders 277, 278, 279, respectively, all for purposes presently more fully appearing. The directional control valves 251, 252, 253 are further connected to a supply line 280 and a return line 281 as schematically illustrated in FIG. 28, the supply line 280 being provided with a high-pressure relief valve 282 which discharges into the return line 281.

Figure 29:
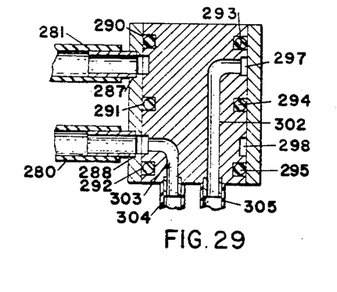
FIG. 29 is a sectional view of a swivel fitting forming part of the present invention.
Figure 30:
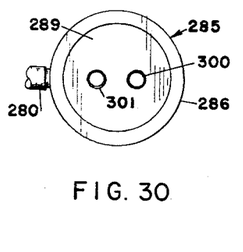
FIG. 30 is a bottom view of the swivel fitting.

Referring now to FIGS. 29 and 30, the hub 52 of the turret 51 is internally fitted with a hydraulic swivel fitting 285 which is mounted in the aperture 101 thereof. The swivel fitting 285 includes a cylindrical sleeve 286 which is secured to the turret 51 in coaxial relation to the hub 52 so as to rotate therewith. The sleeve 286 is provided with vertically spaced inlet and outlet ports 287, 288, respectively, which communicate with the cylindrical internal surface thereof. Externally, the inlet port 287 is connected to the return line 281 and the outlet port 288 is connected to the supply line 280.

Rotatably fitted within the sleeve 286 is a cylindrical center core 289 having three vertically spaced annular grooves 290, 291, 292, which accept O-ring seals 293, 294, and 295, respectively. As will be seen by reference to FIG. 29, the seal 293 is located above the inlet port 287 and the seal 295 is located below the outlet port 288 while the seal 294 is interposed therebetween. Intermediate the grooves 290, 291, the center core 289 is turned down in the provision of an upper annular channel 297 which is in communication with the inlet port 287. Similarly, between the grooves 291, 292, the core 289 is turned down in the provision of a lower annular channel 298 which communicates with the port 288. The core 289 is further axially drilled from its bottom surface in the provision of spaced parallel bores 300, 301, which respectively extend up to, but not beyond, the annular channels 297, 298, respectively. Interconnecting the bores 300 and the annular channel 297 so as to provide communication therebetween is a lower radially extending bore 302 and similarly interconnecting the bore 301 and the annular channel 298 is an upper radially extending bore 303. Interposed between the bore 301 and the pump motor combination 226 is a high-pressure supply line 304 and similarly interposed between the bore 300 and reservoir 227 is a return line 305, all as best seen in FIG. 28. The swivel fitting 286 permits continuous communication between the directional control valves 251, 252, 253, and the pump motor combination 226 and reservoir 227 irrespective of the angular relation between the turret 51 and the truck T. More particularly, hydraulic fluid from the high-pressure supply line 304 enters the swivel fitting 286 through the bore 301 and thereafter finds its way into the lower annular channel 298 through the radial bore 303. Since the channel 298 is continuously in communication with the outlet port 288, the fluid is always free to leave the fitting and flow to the directional control valves 251, 252, 253 through the supply line 280. Fluid from the valves 251, 252, 253 enters the inlet port 287 and flows into the upper annular channel 297 and into the axially extending bore 300 through the radial bore 302. The bore 300 is, of course, in communication with the reservoir 227 through the return line 305. Thus, the turret 51 and articulated beam assembly R are capable of an unlimited number of rotations.

Referring again to FIG. 28, the basket 178 in close proximity to the outer end 157 of the outer beam 155 is provided with three control valves 310, 311, 312, which are actuated by handles 313, 314, 315, respectively. Interconnecting the control valves 310, 311, 312 and the slave cylinders 277, 278, 279 as schematically illustrated in FIG. 28 are pairs of hydraulic lines 316, 317, 318 which pass internally through the beams 119, 155. The basket mounted valves 310, 311, 312 are, in effect, double-acting master cylinders which actuate the directional control valve cylinders 251, 252, 253 by energizing the plungers 273, 274, 275 in the slave cylinders 277, 278, 279. Thus, the hydraulic motor 98 and cylinders 180, 183 can be energized from either the bed of the truck T or from the basket 178. The supply line 280, return line 281 and pairs of hydraulic lines 316, 317, 318 are all interconnected and suitably provided with check valves (not shown) to keep the lines 316, 317, 318 filled with hydraulic fluid. Such connections and check valves are conventional and, therefore, not illustrated or described further herein. Finally, it should be noted that a filter 320 is interposed in the high-pressure supply line 304.

In the inoperative transport position, the articulated beam assembly R, mast assembly M and outriggers are carried on the truck T in the position best seen in FIG. 1. In particular, the articulated beams 119, 155 of the articulated beam assembly R are in a horizontal substantially side-by-side relation with the hinge members 137, 158 located above the cab of the truck T and the outer end 157 of the outer beam 155 resting on the outer beam carrying support 118. Further, the outriggers 18, 19, 20, 21 are in the retracted position in which their respective foot plates 30 are vertically presented so as not to project outwardly beyond the side of the truck T.

When it is desired to gain access to some elevated object, the truck T is driven within close proximity of the object and the outriggers 18, 19, 20, 21 lowered through manipulation of the valve handles 233, 234, 235, 236, which control the valves 229, 230, 231, 232, thereby bringing the foot plates 30 into facewise abutment with the ground so as to provide additional lateral support to the truck frame 1. It should be noted that the outriggers 18, 19, 20, 21 are independently controlled which affords precise leveling even on unlevel terrain.

The workman then climbs into the basket 178 from the deck of the frame 2 and manipulates the handles 313, 314, 315 until the baskets 178, 179 are at the desired elevated location from which easy access to the elevated object can be gained. If desired, an assistant can ride aloft in the basket 179.

More particularly, the workman, by manipulation of the handle 313 in effect controls the directional control valve 251 which, in turn, passes hydraulic fluid under pressure through the line 254 to the hydraulic motor 98. The motor 98, of course, rotates and causes the pinion gear 89 to chase around the teeth 42 of the stationary gear 40, whereby to rotate the upper mast assembly M. By manipulation of the handle 314, the workman can control the valve 252 which, in turn, energizes the hydraulic cylinder 180, causing the piston rod 182 thereof to extend from the barrel 181 with a resultant rising of the lower beam 119. Similarly, by manipulation of the handle 315, the workman can control the valve 253 which, in turn, energizes the hydraulic cylinder 183, causing the piston rod 185 thereof to extend from the barrel 184 and through the arcuately shaped link 187 bear against the upper beam 155, causing the same to rise. Thus, by skillful manipulation of the handles 313, 314, 315, the position of the baskets 178, 179 in space beyond the truck T can be altered.

Referring now to FIGS. 1, 24 and 26, it can be seen that the angular relation between the beams 119 and 155 can be varied from a carrying position in which they are substantially in side-by-side relationship to a fully extended position in which the outer beam 155 travels through an arc of approximately 235°. As the outer beam 155 traverses the arc, the arcuate link 187 rotates approximately 90°. Furthermore, the lower link 193 similarly passes through an arc of approximately 90° until it comes into abutment with the hinge pin 144. In the fully extended position, the baskets 178, 179 may be brought into close proximity to the ground and the workman can step out to obtain additional tools or equipment. The leveling lines 209, 212, as previously described herein, maintain the baskets in the same man-supporting position, that is to say, with the opening therein presented upwardly, irrespective of the angular relation between the inner beam 119 and the outer beam 155 or the angular relation between the inner beam 119 and the mast M. The unique linkage system interconnecting the hinge members 137, 158, and the piston rod 184 permits a substantially greater traverse of the outer beam 155 with respect to the inner beam 119 than has heretofore been achieved and, furthermore, permits precise positioning of outer beam 155.

Moreover, the spur gear drive mechanism carried on the turret 51 will not become damaged if the mast M or articulated beam R is subjected to unauthorized outside forces for such gears do not lock, but merely rotate upon the application of such forces. Also it should be noted that there is sufficient slippage within the hydraulic motor 98, even when the lines 254 are locked, to permit the upper mast assembly M to rotate when such forces are applied. Nevertheless, it is possible to precisely position the mast M and, of course, the baskets 178, 179 for the shoes 65, 65', 69, 69' frictionally engage the walls of the annular groove 43 and quickly impede rotation once the fluid supply to the hydraulic motor 98 is terminated. In other words, the inertial forces generated by the rotating mast M and articulated beam assembly R will not carry the baskets 178, 179 substantially beyond the point at which the handle 313 is released. Thus, the hazards presented with conventional aerial platform units are not presented in the present invention.

It should be noted that the hydraulic motor 98 is reversible and the hydraulic cylinders 180, 183 are double-acting, thus permitting the reverse of any movement hereinbefore described and, of course, the return of the articulated beam assembly R to its carrying position illustrated in FIG. 1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A mast assembly adapted to carry aerial platforms, derrick booms, and the like on a supporting structure such as a truck frame, said mast assembly comprising a base means rigidly fastened to the supporting structure and provided with a horizontally disposed annular groove, a turret mounted on the base means, guide elements mounted rigidly on the turret and projecting therefrom into engagement with the walls of the annular groove, substantially the entire weight of the turret being borne by the guide elements so that the downwardly directed force caused by the turret and components carried thereby is transferred to the base through the guide elements, whereby to rotatably and retentively hold the turret on the base means.

2. A mast assembly adapted to carry aerial platforms, derrick booms, and the like on a supporting structure such as a truck frame, said mast assembly comprising a base means securely mounted on the supporting structure and provided with an upwardly opening recess and a horizontally formed annular groove having upper and lower continuous surfaces opening inwardly into the recess, a turret mounted on the base means, guide elements projecting outwardly from the turret into the groove for slidable engagement with upper and lower surfaces thereof and in such a manner that substantially all of the moments applied to the turret by force components acting in vertically presented planes are transferred to the base means through the guide elements acting upon the upper and lower surfaces of the groove, substantially the entire weight of the turret being borne by the guiding elements so that the downwardly directed force caused by the turret and components carried thereby is transferred to the base through the guide elements, whereby to rotatably and retentively carry the turret.

3. A mast assembly adapted to carry aerial platforms, derrick booms, and the like on a supporting structure such as a truck frame, said mast assembly comprising a base means securely mounted on the supporting structure and provided with a vertically disposed bore and a horizontally formed annular groove located above the bore, a turret mounted on the base means, a hub depending from said turret and journaled within the bore, sealing means for retaining a fluent lubricant above the bore, guide elements projecting from the turret into slidable engagement with the walls of the groove, substantially the entire weight of the turret being borne by the guide elements so that the downwardly directed force caused by the turret and components carried thereby is transferred to the base through the guide elements, whereby to rototably and retentively carry the turret.

4. A mast assembly adapted to carry aerial platforms, derrick booms, and the like on a supporting structure such as a truck frame, said mast assembly comprising a base member rigidly fastened to the supporting structure and provided with an upwardly opening recess, a horizontal annular groove opening inwardly into the recess, and a downwardly extending diametrically reduced bore opening upwardly into the recess, a turret operatively mounted on the base member, a cylindrical hub depending from the underface of the turret and projecting into the bore, sealing means between the walls of the bore and the hub for retaining a fluent lubricant within the recess, guide elements rigidly carried by and projecting outwardly from the turret into slidable engagement with the walls of the groove, substantially the entire weight of the turret being borne by the guide elements so that the downwardly directed force caused by the turret and components carried thereby is transferred to the base member through the guide elements, whereby to rotatably and retentively carry the turret on the base member.

5. A mast assembly adapted to carry aerial platforms, derrick booms, and the like on a supporting structure such as a truck frame, said mast assembly comprising a base member rigidly fastened to the supporting structure and provided with an upwardly opening recess, a horizontal annular groove opening inwardly into the recess, and a downwardly extending diametrally reduced bore opening upwardly into the recess, a turret operatively mounted above the base member, a hub depending from the underface of the turret and projecting into the bore, sealing means between the hub and the wall of the bore for retaining a fluent lubricant within the recess, and first and second opposed arcuate guide elements rigidly carried by and projecting outwardly from the turret into slidable engagement with the walls of said groove, substantially the entire weight of the turret being borne by the guide elements so that the downwardly directed force caused by the turret and components carried thereby is transferred to the base member through the guide elements, whereby to rotatably and retentively carry the turret on the base member.

6. A mast assembly adapted to operatively carry aerial platforms, derrick booms, and the like on a supporting structure such as a truck frame, said mast assembly comprising an annular base member rigidly fastened to the supporting structure and having an inwardly presented cylindrical surface which is relieved in the provision of an annular groove, a web extending inwardly beyond the cylindrical surface and being relieved in the provision of an aperture concentrically disposed to the cylindrical walls of the recess, a turret operatively mounted on the base member, a cylindrical hub rigidly fastened to the underface of the turret and depending therefrom into rotatable engagement with the wall defining the aperture, and a plurality of guide elements rigidly secured to the underface of the turret in outwardly spaced concentric relation to the hub, the guide elements being adapted for retentive engagement with the groove, whereby the turret is rotatably and retentively carried by the base member.

7. A mast assembly adapted to operatively carry aerial platforms, derrick booms, and the like on a supporting structure such as a truck frame, said mast assembly comprising an annular base member adapted for rigid securement to the supporting structure and having an inwardly presented cylindrical surface which is relieved in the provision of an annular groove, the outwardly presented surface of the base member being cut in the provision of gear teeth, a web extending inwardly below the cylindrical surface and being relieved in the provision of an aperture concentrically disposed to the cylindrical surface, a turret operatively mounted on and above the base member, a cylindrical hub rigidly fastened to the underface of the turret and depending therefrom into rotatable engagement with the walls defining the aperture, a plurality of guide elements rigidly secured to the underface of the turret in outwardly spaced concentric relation to the hub, the guide elements being adapted for slidable engagement with the groove, whereby to rotatably and retentively hold the turret on the base member, and actuating means carried by the turret and having a pinion gear adapted to engage the teeth of the base member, whereby to rotate the turret.

8. A mast assembly adapted to operatively carry aerial platforms, derrick booms, and the like on a supporting structure such as a truck frame, said mast assembly comprising an annular base member adapted for rigid securement to the supporting structure and having an inwardly presented cylindrical surface which is relieved in the provision of an annular groove, the outwardly presented surface of the base member being cut in the provision of spur gear teeth, a web extending inwardly below the cylindrical surface and being relieved in the provision of an aperture concentrically disposed to the cylindrical surface, a turret operatively mounted on and above the base member, a cylindrical hub rigidly fastened to the underface of the turret and depending therefrom into rotatable engagement with the walls defining the aperture, a plurality of guide elements rigidly secured to the underface of the turret in outwardly spaced concentric relation to the hub, the guide elements being adapted for slidable engagement with the groove, whereby to rotatably and retentively hold the turret on the base member, actuating means carried by the turret for rotating the same, and a gear train interposed between the gear teeth of the base member and the actuating means, the gears of the gear train being spur gears.

9. An articulated beam assembly for use on a mast; said beam assembly comprising an inner beam hingedly connected at its inner end to the mast, an outer beam hingedly connected to the outer end of the inner beam for movement in laterally spaced relation thereto, the beams being adapted at their hinged juncture to come into side-by-side relation with respect to one another in which position the opposed inner side faces of the beams are located a finite distance apart, a first link hingedly connected to the inner beam for movement generally in the finite space between the beams, a second link hingedly connected to the outer beam for movement generally above the first link, the links being connected to one another, and extensible actuating means interconnecting at least one of the links and one of the beams.

10. An articulated beam assembly according to claim 9 wherein the first link is hingedly connected to the second link intermediate the ends of the second link; the extensible actuating means is pivotally connected to the opposite end of the second link; and the opposite end of the actuating means is connected to the inner beam.

11. An articulated beam assembly according to claim 10 wherein the actuating means is a hydraulic cylinder which is located generally in the finite space between the beams when the beams are in side-by-side relation.

12. An articulated beam assembly for use on a mast; said beam assembly comprising an inner beam hingedly connected to the mast at its inner end, an outer beam hingedly mounted on the inner beam for swinging movement in laterally spaced relation with respect thereto, at least one of the beams being rigidly provided at its end with a laterally offset portion which extends toward and generally across the end of the opposite beam, a hinge pin extending through the laterally offset portion and into the opposite beam whereby the beams are hingedly secured to one another in laterally spaced relation, the laterally offset portion being of such a configuration that the beams can come into side-by-side relation with respect to one another, in which position a finite space exists between the beams, a first link hingedly connected to the inner beam in spaced relation to the hinge pin, a second link hingedly connected to the outer beam in spaced relation to the hinge pin, the links being hingedly connected to one another, and extensible actuating means hingedly connected to at least one of the links and to one of the beams.

13. An articulated beam assembly according to claim 12 wherein the first link is connected to the outer beam for movement generally in the finite space between the beams; the second link is connected to the outer beam for movement generally above the first link; and the actuating means is located generally in the finite space between the beams when the beams are in side-by-side relation.

14. An articulated beam assembly for use on a mast; said beam assembly comprising an inner beam hingedly connected to the mast at its inner end and provided with a laterally offset portion at its outer end, an outer beam located in laterally spaced relation with respect to the inner beam and provided at its inner end with a laterally offset portion which extends generally across the laterally offset portion of the inner beam, a hinge pin extending through the laterally offset portions whereby the beams are hingedly joined to one another, the laterally offset portions being of such configuration that the beams can come into side-by-side relation, in which position a finite space exists between the beams, a first link hingedly connected to the inner beam in spaced relation to the hinge pin, a second link hingedly connected to the outer beam in spaced relation to the hinge pin, the links being hingedly connected to one another, and extensible actuating means interconnecting at least one of the links and one of the beams.

15. An articulated beam assembly according to claim 14 wherein the first link is connected to the outer beam for movement generally in the finite space between the beams; the second link is connected to the outer beam for movement generally above the first link; and the actuating means is located generally in the finite space between the beams when the beams are in side-by-side relation.

16. An articulated beam assembly according to claim 15 wherein the first and second links are connected to the laterally offset portions of the inner and outer beams, respectively.

17. An articulated beam assembly according to claim 15 wherein the second link is connected to the outer beam at its one end and to the extensible actuating means at its other end, and the first link is connected to the second link intermediate the ends of the second link.

18. An articulated beam assembly for use on a mast; said beam assembly comprising an inner beam hingedly connected to the mast at its inner end and provided at its outer end with a first hinge member, an outer beam located in laterally spaced relation with respect to the inner beam and provided at its inner end with a second hinge member, the first hinge member projecting laterally toward the outer beam, the second hinge member projecting laterally toward the inner beam and being in overlapping relation to the first hinge member, a hinge pin extending through the hinge members whereby the inner and outer beams are hingedly connected to one another, and means for swinging the beams relative to one another.

19. An articulated beam assembly according to claim 18 wherein the first and second hinge members are provided with longitudinally extending legs, and the hinge pin extends through the longitudinally extending legs.

20. An articulated beam assembly according to claim 18 wherein the means for swinging the beams relative to one another comprises a first link hingedly connected to the inner beam in spaced relation to the hinge pin for movement generally in the space between the beams, a second link hingedly connected to the outer beam and to the first link, and extensible actuating means connected to one of the links and to one of the beams.

21. An articulated beam assembly according to claim 20 wherein the second link is connected to the outer beam at its one end and to the extensible actuating means at its other end; and the first link is connected to the second link intermediate the ends of the second link.

22. An articulated ebam assembly according to claim 9 wherein the beams are in overlapping relation at their hinged juncture; and a hinge pin hingedly connects the beams to one another.

23. An articulated beam assembly for use on a mast; said beam assembly comprising an inner beam hingedly connected to the mast at its inner end, an outer beam hingedly connected at its inner end to the outer end of the inner beam, a first link hingedly connected to the inner beam in spaced relation to the hinged juncture of the beams, a second link hingedly connected to the outer beam in spaced relation to the hinged juncture of the beams, and extensible actuating means hingedly connected to the second link and to the inner beam, the first link being hingedly connected to the second link intermediate the hinged juncture of the second link and outer beam and the hinged juncture of the second link and actuating means.

24. An articulated beam unit according to claim 23 wherein the outer beam is hingedly connected to the inner beam for movement in laterally spaced relation thereto, and the beams are adapted at their hinged juncture to come into side-by-side relation with respect to one another.

References Cited

UNITED STATES PATENTS

| | | | |
|---|---|---|---|
| 2,481,416 | 9/1949 | Grundon | 212—68 |
| 3,082,842 | 3/1963 | Balogh | 182—2 |
| 3,132,718 | 5/1964 | Pierce | 182—2 |

REINALDO P. MACHADO, *Primary Examiner.*